(12) United States Patent
Gumpoltsberger

(10) Patent No.: US 7,313,981 B2
(45) Date of Patent: Jan. 1, 2008

(54) REVERSE GEAR ARRANGEMENT IN A COUNTERSHAFT TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 94 days.

(21) Appl. No.: 10/946,520

(22) Filed: Sep. 21, 2004

(65) Prior Publication Data

US 2005/0103140 A1   May 19, 2005

(30) Foreign Application Priority Data

Sep. 23, 2003  (DE)  ................ 103 43 994

(51) Int. Cl.
*F16H 3/38* (2006.01)
(52) U.S. Cl. .................. 74/340; 74/329; 74/330; 74/331; 74/333; 74/359; 74/360
(58) Field of Classification Search .......... 74/329, 74/330, 331, 333, 339, 340, 359, 360
See application file for complete search history.

(56) References Cited

U.S. PATENT DOCUMENTS

| 760,460 | A | | 5/1904 | Leighton | |
|---|---|---|---|---|---|
| 3,434,366 | A | | 3/1969 | Raso et al. | |
| 4,311,067 | A | | 1/1982 | Froumajou | |
| 4,543,011 | A | | 9/1985 | Lindenthal | |
| 4,658,663 | A | * | 4/1987 | Hiraiwa | ............. 74/359 |
| 4,771,648 | A | | 9/1988 | Bardoll | |
| 5,107,951 | A | | 4/1992 | Kawamura | |
| 5,180,249 | A | | 1/1993 | Hanser et al. | |
| 5,404,772 | A | | 4/1995 | Jester | |
| 5,503,039 | A | | 4/1996 | Bailly et al. | |
| 5,890,392 | A | * | 4/1999 | Ludanek et al. | ............. 74/331 |
| 6,244,123 | B1 | * | 6/2001 | Hegerath et al. | ............. 74/325 |
| 6,634,247 | B2 | | 10/2003 | Pels et al. | |
| 6,675,668 | B2 | | 1/2004 | Schamscha | |
| 6,830,528 | B2 | | 12/2004 | Yamada | |
| 6,832,978 | B2 | * | 12/2004 | Buchanan et al. | ......... 477/174 |
| 6,883,394 | B2 | * | 4/2005 | Koenig et al. | ............ 74/335 |
| 7,155,994 | B2 | | 1/2007 | Gumpoltsberger | |
| 7,225,695 | B2 | * | 6/2007 | Gumpoltsberger et al. | ... 74/325 |
| 2004/0093972 | A1 | | 5/2004 | Gumpoltsberger et al. | |
| 2004/0162180 | A1 | | 8/2004 | Gumpoltsberger et al. | |

(Continued)

FOREIGN PATENT DOCUMENTS

DE          372 153       3/1923

(Continued)

*Primary Examiner*—David D. Le
(74) *Attorney, Agent, or Firm*—Davis Bujold & Daniels, P.L.L.C.

(57) ABSTRACT

A reverse gear arrangement in a countershaft transmission (1, 40, 44) having at least one starting element (2, 41), at least one transmission input shaft (4, 5, 42), one countershaft (22), fixed or idler gear wheels fastened or rotatably supported on the shafts, shifting sets (20, 21, 37, 38) coordinated with the idler gears and a reverse gear shaft (30, 31) upon which a driveable gear wheel (29, 32) and a driveable gear wheel (28, 33) are fastened. It is proposed for further development of the transmission that the driveable gear wheel (29, 32) of the reverse gear (RG) be meshed with a fixed gear (12, 14) of another transmission gear which is fastened on at least one transmission input shaft (4, 5, 42).

14 Claims, 3 Drawing Sheets

U.S. PATENT DOCUMENTS

| | | | |
|---|---|---|---|
| 2005/0000307 A1* | 1/2005 | Gumpoltsberger | 74/331 |
| 2006/0117882 A1* | 6/2006 | Gitt | 74/340 |

FOREIGN PATENT DOCUMENTS

| | | |
|---|---|---|
| DE | 1 934 100 | 6/1971 |
| DE | 27 15 949 | 9/1978 |
| DE | 30 33 625 A1 | 4/1982 |
| DE | 82 10 013 | 12/1983 |
| DE | 34 14 107 A1 | 10/1985 |
| DE | 34 27 226 A1 | 1/1986 |
| DE | 37 15 880 A1 | 5/1988 |
| DE | 41 37 143 A1 | 5/1993 |
| DE | 44 36 526 A1 | 10/1995 |
| DE | 298 20 977 | 4/1999 |
| DE | 198 21 164 A1 | 11/1999 |
| DE | 199 44 879 A1 | 3/2001 |
| DE | 202 12 094 U1 | 11/2002 |
| DE | 102 53 259 A1 | 5/2004 |
| EP | 0 976 952 A1 | 2/2000 |
| EP | 1 067 312 A1 | 1/2001 |
| EP | 1 077 336 A1 | 2/2001 |
| GB | 1 407 130 | 9/1975 |
| GB | 2 258 020 A | 1/1993 |

* cited by examiner

REVERSE GEAR ARRANGEMENT IN A COUNTERSHAFT TRANSMISSION

This application claims priority from German Application Serial No. 103 43 994.3 filed Sep. 23, 2003.

FIELD OF THE INVENTION

The invention concerns a countershaft transmission.

BACKGROUND OF THE INVENTION

DE 41 37 143 A1 has disclosed a multi-speed synchronized countershaft transmission where the gear positions of two gears are respectively coordinated with one of several shifting sets. Said shifting sets, as a rule, comprise sliding sleeves axially displaceably but non-rotatably situated upon a transmission shaft and which during a shifting operation, interacting with synchronizer rings adjacent to said sliding sleeves, decelerate idler gear wheels and can non-rotatably connect them with said transmission shaft.

In this known transmission, the two gears (first gear and third gear or second gear and fourth gear), coordinated with a shifting set, are two non-consecutive transmission gears. Said transmission construction has the advantage that a transmission shifting system is hereby created with which an overlapping shift actuation and therewith reduced shifting times are made possible. But it is a disadvantage that such a transmission cannot be shifted via a shifting device having an H-gate, since with one, such can usually be shifted in the same gate only two transmission gears which are immediately consecutive.

To overcome said problem, the pre-published DE 102 53 259.1 has one universally designable dual-clutch transmission which is essentially comprised of one starting unit, one core transmission and one output unit. The starting unit comprises a single clutch, one dual clutch, or one torque converter and the output unit contains transmission parts for a front-transverse drive, for a front-longitudinal drive, for a rear-longitudinal drive, or for an all-wheel drive of a vehicle. The core transmission is designed as a countershaft transmission having available at least one input shaft, one countershaft and one transmission output which is not coaxially oriented to at least one transmission output shaft.

The gear sequence in said transmission is such that beginning from the starting element (clutch) next to the fourth gear, the sixth gear, the second gear, the reverse gear, the seventh, the fifth, the third and the first gears follow. The fixed gears of the fourth, sixth, second and reverse gears are here non-rotatably fastened on a hollow shaft connected with the output side of one of the two clutches of a dual clutch, while the fixed gears of the seventh, the fifth, the third and the first gears are fastened on a second transmission input shaft coaxially supported in said hollow shaft and connected with the output side of the second clutch of the dual clutch.

DE 198 21 164 A1 has finally disclosed a six-gear dual-clutch transmission in which two fixed gears are situated upon a first transmission input shaft designed as hollow shaft. While the first fixed gear is meshed with one idler gear for the reverse gear and one second idler gear for the second gear, the second fixed gear meshed with one idler gear for the sixth gear, the same as with one idler gear for the fourth gear. Besides, in this transmission said idler gears for the reverse gear and the sixth gear are supported on a first countershaft while the idler gears for the second gear and the fourth gear are situated upon a second countershaft. This dual-clutch transmission is made comparatively short so that it can be used for front-transverse installation in vehicles. But a disadvantage is its comparatively large diameter which is determined by a total of six transmission shafts paraxial to each other of which the output shaft for the forward gears of the transmission is not shown.

With this background, the problem to be solved by the invention is to introduce a countershaft transmission, which due to its constructional features has a smaller diameter than the transmission according to DE 198 21 164 A1, is made comparatively short and can be designed as manually operable dual-clutch transmission or as manual selector transmission having only one starting and gear clutch.

SUMMARY OF THE INVENTION

The inventive countershaft transmission is accordingly equipped with at least one starting element, at least one transmission input shaft, one countershaft, fixed or idler gear wheels fastened or rotatably supported on said shafts, shifting sets coordinated with said idler gears and one reverse gear shaft upon which are fastened one driveable gear wheel and one driving gear wheel. In addition, the driveable gear wheel of the reverse gear is in this transmission meshed with a fixed gear of one other transmission gear which is fastened upon at least one transmission input shaft.

In a specially preferred development of the invention, the other transmission gear is preferably the first or the second gear. Besides, it is deemed advantageous that the fixed gear of this other transmission gear and the driving gear wheel of the reverse gear be disposed axially, side by side.

Another advantageous embodiment of the invention is that the reverse gear shaft is not disposed in the plane fixed by the transmission input shaft and the countershaft but offset thereto.

In addition, the reverse gear idler gear of the countershaft transmission is meshed with the driving gear wheel of the reverse gear shaft.

According to another alternative of the invention, the driveable gear wheel and the gear wheel to be driven have different numbers of teeth on the reverse gear shaft.

A transmission equipped with this reverse gear construction can have a starting element designed as a clutch, a single clutch, or a hydrodynamic torque converter.

It can further be provided for compact design of the transmission, that departing from a central bearing plane "D" the number of gears on at least one transmission input shaft and the countershaft respectively increase in a direction towards the starting element and in an opposite direction.

Starting from the central bearing plane D, the gear wheels of the reverse gear RG and the even numbered gears G2, G4, G6, the same as in the opposite direction the gear wheels of the odd numbered gears G1, G3, G5, G7, are here preferably disposed in the direction to the starting element.

A small diameter and short seven-gear transmission, combined with one or more of the above features, is created with the gear sequence, departing from the starting element, running as follows: sixth gear, fourth gear, second gear, reverse gear, first gear, third gear, fifth gear and seventh gear.

If with the above mentioned core transmission sketch, a dual-clutch transmission is to be created, two transmission input shafts are used, of which the first is designed as a hollow shaft in which the second input shaft is supported.

In this dual-clutch transmission, behind the free end of the hollow shaft upon the second transmission input shaft, in direction toward the free end thereof, the fixed gears of low gears are first fastened and the idler gears of higher gears are then supported.

Departing from the central bearing plane D, upon the hollow shaft in a direction towards the starting element, the fixed gear of a low gear G2 is first fastened and then the idler gears of high gears G4, G6 are supported.

One other alternative of the invention provides a single-clutch transmission of countershaft design, upon the single transmission input shaft, departing from the central bearing plane D in the direction toward the single starting element, first one fixed gear and subsequently two idler gears, the same as in opposite direction first two fixed gears and subsequently two idler gears, be successively disposed.

Independently of whether the inventively designed transmission is a dual-clutch transmission or a transmission having only one starting element, it is deemed advantageous that the idler gear for the highest transmission gear G7 be situated on the free end of the second transmission input shaft or on the free end of the single transmission input shaft.

Furthermore, the length of the transmission is shortened by coordinating in groups, one common shifting set respectively with the idler gears for the sixth gear and the fourth gear, for the fifth gear and the seventh gear, for the second gear and for the first gear and the third gear be respectively connectable by means of a single acting shifting set with the respectively coordinated transmission shaft.

A second alternative provides, on the contrary, that with the idler gears of the first gear and of the reverse gear, of the third gear and of the fifth gear, the same as of the second gear and of the fourth gear, a common shifting set be respectively coordinated, while the idler gears of the fifth and of the seventh gear be connectable each with the coordinated transmission shaft by means of single acting shifting sets.

In a last alternative, in this connection it is provided that with the idler gears of the first gear and of the reverse gear, of the third gear and of the fifth gear, the same as of the fourth gear and of the sixth gear, a common shifting set be respectively coordinated while with the idle gears of the second and of the seventh gear an individual single acting shifting set be coordinated.

According to another development of the invention it is provided that the countershaft be coaxially connected with a shaft leading at least to one differential transmission or drives such shaft via an input toothing. Said shaft can be a so-called universal shaft which leads to a rear-axle differential transmission and/or to a front-axle differential transmission in the area of the starting element of a vehicle.

Let it here be finally observed that the inventively designed transmission can be an automatic dual-clutch transmission, an automated operable shift transmission, or a manually actuatable gearshift transmission.

BRIEF DESCRIPTION OF THE DRAWINGS

The invention will now be described, by way of example, with reference to the accompanying drawings in which.

DETAILED DESCRIPTION OF THE INVENTION

Figure 1:
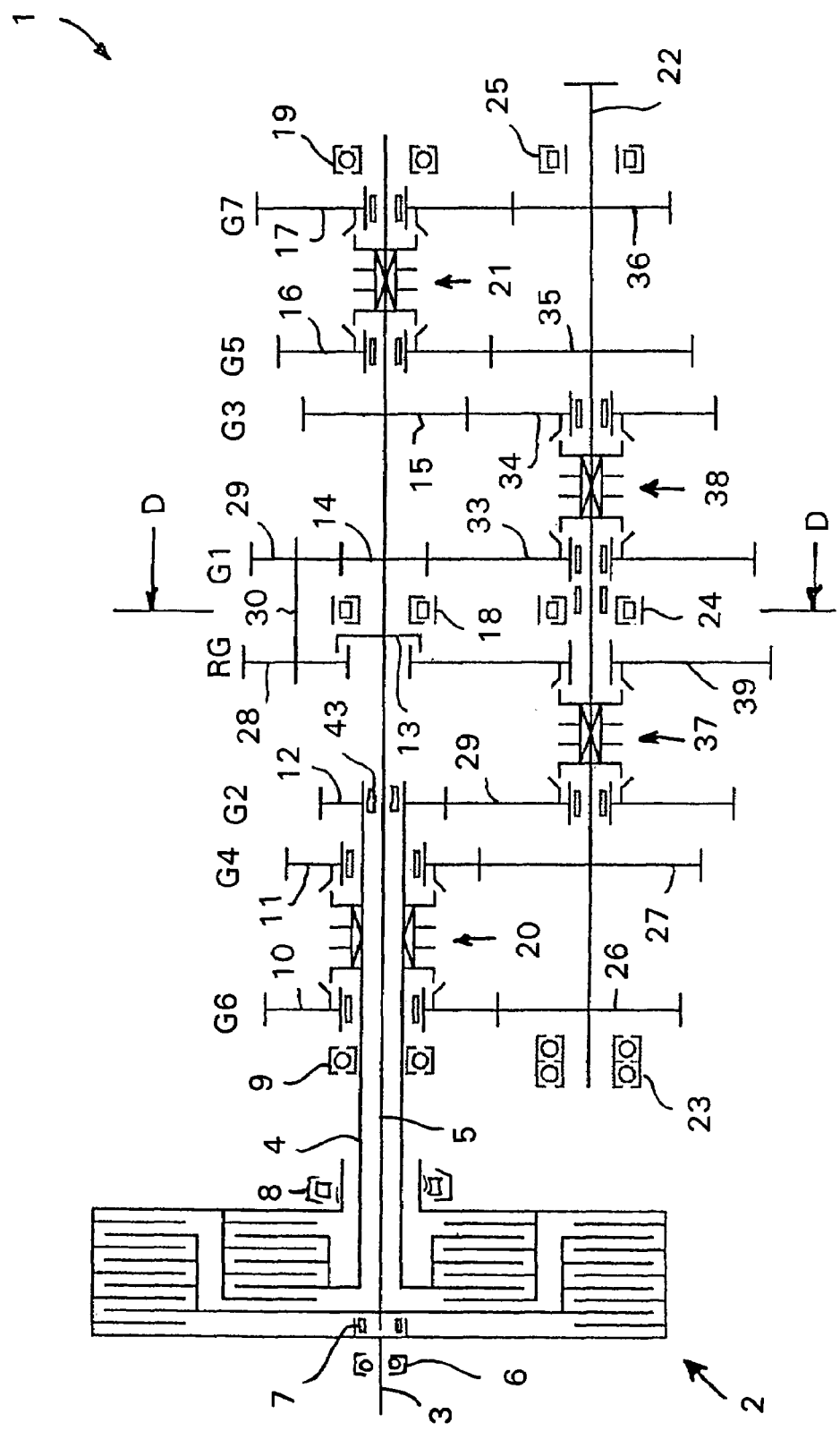
FIG. 1 is a diagrammatic design of an inventively developed dual-clutch transmission.
Figure 2:
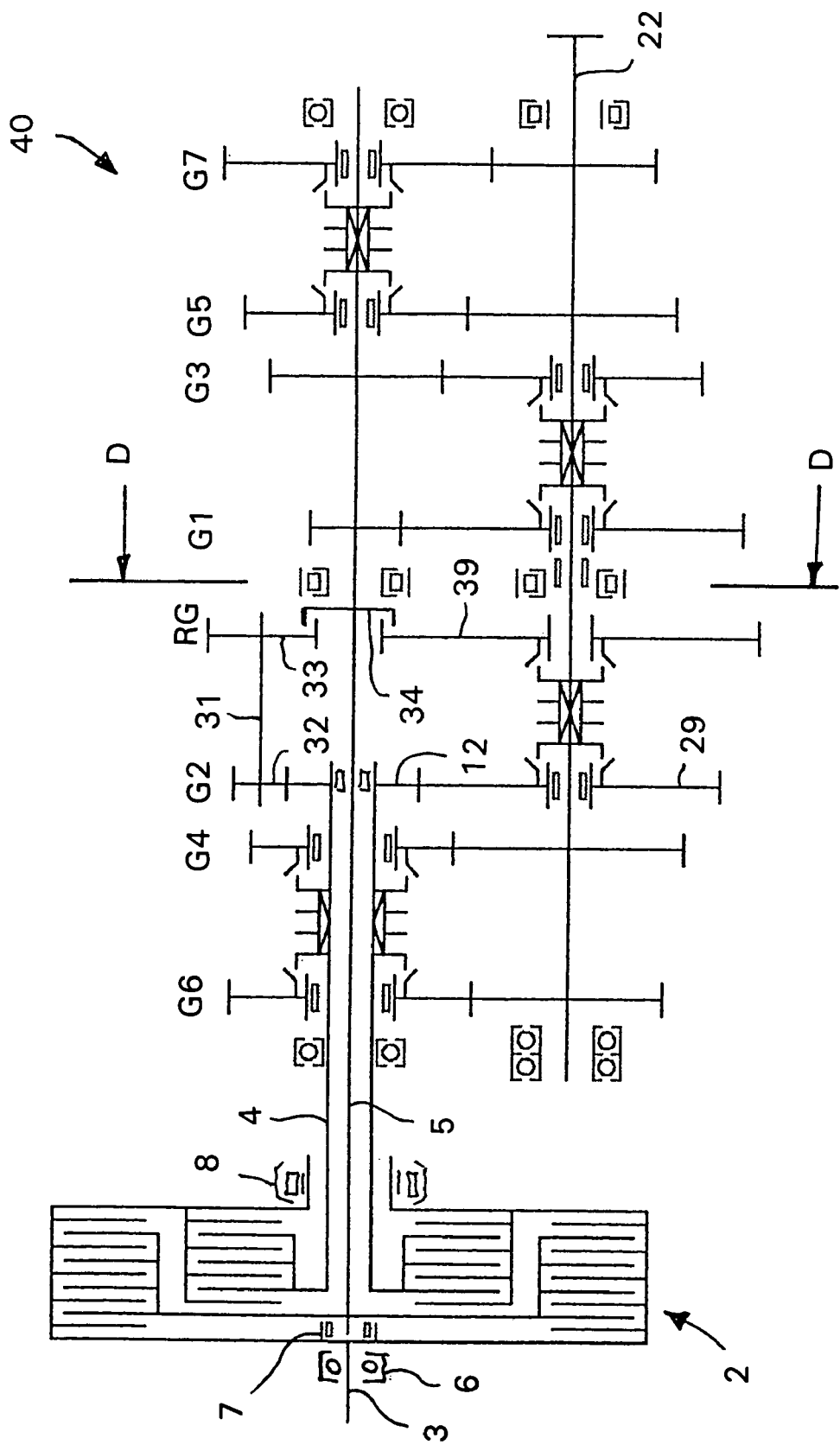
FIG. 2 is a dual-clutch transmission like in FIG. 1, but with another drive mechanism for the reverse gear.
Figure 3:
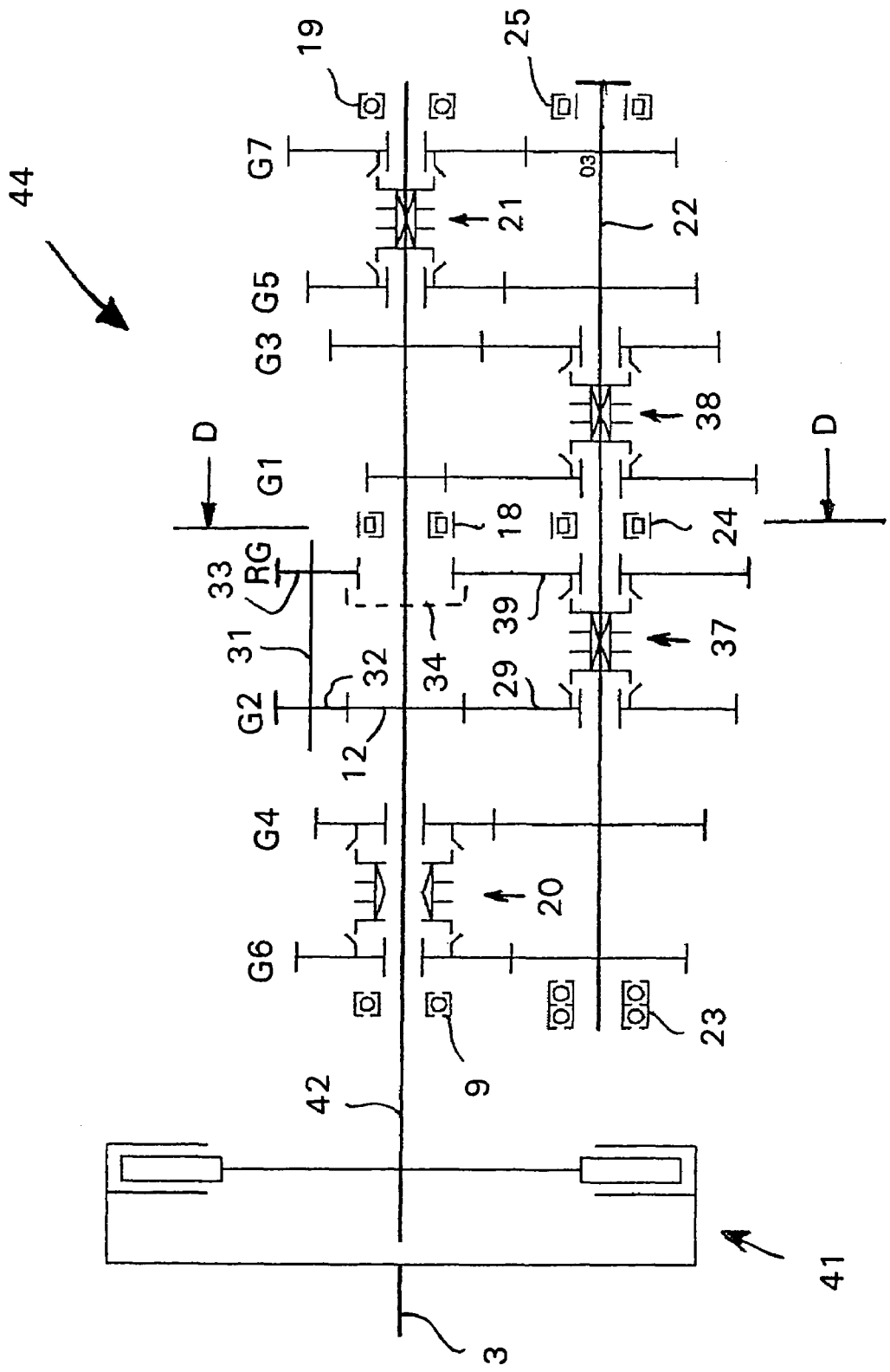
FIG. 3 is a countershaft transmission with one starting and gearshift clutch.

FIGS. 1 to 3 accordingly illustrate that the inventive design of a countershaft transmission can be used both in dual-clutch transmissions and in countershaft transmissions having only one starting and gearshift clutch. According to FIG. 1, the dual-clutch transmission 1 therefore has available one dual clutch 2 in which the input sides of both clutches are connected with the crankshaft 3 of an internal combustion engine (not shown). Both clutches are disposed coaxially to each other in a manner known per se, the input sides of both clutches resting via roller bearings 6, 8 on a transmission housing (not shown).

The output side of the radially inner clutch is non-rotatably connected with a first transmission input shaft 4 designed as hollow shaft, while the output side of the radially outer clutch communicates with a second transmission input shaft 5 supported in the hollow shaft 4. For this purpose, in the area of the dual clutch 2 is provided one roller bearing 7 and on the free end of the hollow shaft 4 one roller bearing 43 which is inserted in said hollow shaft 4 and rotatably supports the second transmission input shaft 5.

FIG. 1 also shows in the countershaft transmission 1, one countershaft 22 is disposed paraxially to both input shafts 4, 5 and acts as a transmission output shaft for a vehicle rear-engine drive.

As made clear in FIG. 1, the dual-clutch transmission 1 shown here is one having seven forward gears G1 to G7 and one reverse gear RG. The ratio steps forming the transmission gears are implemented by gear wheel pairs which, by roller bearings 18, 24 located in a central bearing plane D respectively for a second transmission input shaft 5 and for the countershaft 22, are divided in two groups of equal size of transmission gears.

These transmission gear groups are composed so that between the dual clutch 2 and the cental bearing plane D are disposed the gear wheels of even numbered gears and in the other gear group the gear wheels of odd numbered gears. The peculiarity exists here that in both gear groups the reduction ratio decreases pointing away from the central bearing plane D and the gear number increases. Accordingly, between the central bearing plane D and the clutch 2, the gear wheels are in this sequence for the reverse gear RG, the second gear G2, the fourth gear G4 and the sixth gear G6. On the contrary in the other gear groups, departing from the central bearing plane D, the gear wheels are in this sequence for the first transmission gear G1, the third gear G3, the fifth gear G5 and for the seventh gear G7.

Even though the following already results from the gear sequence described, for the sake of clarity it must be indicated that directly on the right and left sides of the two central bearings 18 and 24 are respectively situated the gear wheels 28, 39 for the reverse gear RG, and 14, 33 for the first gear G1. By this design it is possible, better than in the transmissions of the prior art, to absorb the shaft bendings produced by gearing forces. Here the roller bearings 9, 19, 23, 25, 43 on the first transmission input shaft (hollow shaft 4), on the free end of the second transmission input shaft 5 and on the countershaft 22 also obviously assist.

FIG. 1 also shows that departing from the roller bearings 18, 24 in the central bearing plane D in direction to the dual clutch 2, a fixed gear 12 for the second gear G2 is first situated upon the hollow shaft 4 while in opposite direction fixed gears 14, 15 for the first gear G1 and the third gear G3 are positioned first. Said fixed gears 12, 14, 15 mesh here with the idler gears 29, 33, 34 upon the countershaft 22 that are connected therewith.

The behavior is reversed regarding the gear wheel pairs for the remaining transmission gears. Thus, between the dual clutch 2 and the central bearing plane D upon the first transmission input shaft 4, are the idler gears 10, 11 for the sixth gear G6 and the fourth gear G4 which mesh with coordinated fixed gears 26, 27 upon the countershaft 22. Besides, upon the second transmission input shaft 5, in the area of their free end, are located the idler gears 16, 17 for the fifth gear G5 and for the seventh gear G7 which mesh with coordinated fixed gears 35 or 36 upon the countershaft 22.

Of special importance relative to the invention is the arrangement of the reverse gear in this transmission. As FIG. 1 shows, the driving and driven gear wheels of the reverse gear RG are to the right or left side together with the bearings 18, 24 of the central bearing plane D which are over-stressed by a reverse gear shaft 30.

It is at the same time provided in this embodiment that the driveable fixed gear 29 of the reverse gear RG non-rotatably connected with said reverse gear shaft 30 be meshed with the fixed gear 14 of the transmission gear G1. Besides, the reverse gear shaft 30 carries one other fixed gear 28 which acts as an output reverse gear wheel and drives a reverse idler gear 39 upon the countershaft 22.

Insofar as said reverse gear idler gear 39 is connected by the synchronization and coupling means of the shifting set 37 with the countershaft 22, the latter moves as result of the above described reversal in direction of rotation in direction opposite to the direction of rotation, as is the case in engaged forward gears G1 to G7. Later will be discussed the design and mode of operation of the shift sets known per se.

Also important for the advantages to be obtained by the invention is that the reverse gear shaft 30 is not situated in the plane fixed by the transmission input shaft 4, 5 and the countershaft 22. That the driveable gear wheel 28 on the reverse gear shaft 30 with the reverse gear idler gear 39 meshes on the countershaft 22 is symbolized as usual by the clip 13.

The above described steps achieve that the two gear wheels 28, 29 upon the reverse gear shaft 30 can have a different number of teeth whereby the reverse gear ratio available can be adjusted to a very advantageous value substantially corresponding to the ratio of the first gear G1.

One other result of said design is that the diameter of the reverse gear idler gear 39 to be driven, compared to other similar transmission designs, can be clearly larger, since the crown circle diameter of said idler gear 39 no longer has to be laid out with regard to the crown circle diameter of a driving gear wheel on one of the two transmission input shafts 4, 5. Said diameters naturally cannot intersect on account of the opposition in direction of the rotary movement of the reverse gear drive.

As the illustration of the transmission structure in FIG. 1 additionally shows, this dual-clutch transmission 1 has available known synchronization and coupling means already mentioned for the idler gears with the aid of which a uniformity in rotational speed is adjusted between the idler gear concerned and the transmission shaft 4, 5, 22 concerned for the engagement and shifting of a selected transmission gear. Such synchronization means can be a synchronizer ring displaceable by a sliding sleeve axially upon a brake surface of an idler gear. In case of rotational speed uniformity, by axial displacement of the sliding sleeve, a non-rotatable connection is created between the transmission shaft and the idler gear. Such synchronization and coupling means are combined in a manner known per se to form the so-called shifting sets with which can be shifted, for ex., two adjacent idler gears.

Of special interest in this structure of the transmission is that one such shifting set 20 is situated between the idler gears for the sixth gear G6 and the fourth gear G4 upon the hollow shaft 4, one shifting set 21 upon the second transmission input shaft 5 between the fifth gear G5 and the seventh gear G7, one shifting set 37 upon the countershaft 22 between the second gear G2 and the reverse gear RG and one fourth shifting set 38 upon the countershaft 22 between the first gear G1 and the third gear G3.

The transmission 1 furthermore can also be designed with the alternative coordinations of shifting sets with the transmission idler gears mentioned at the beginning of the short description of the invention, in which embodiments of the invention each two gear wheel pairs has its own synchronization and coupling means acting only upon one idler gear. Even if for reasons of cost and installation space this is not always advantageous due to other parameters of transmission design, still it often cannot be evaded.

It becomes clear that independently of the arrangement of the shifting sets use is still made of the basic idea according to which the driveable gear wheel of the reverse gear RG is meshed with a fixed gear of one other transmission gear which is fastened upon at least one transmission input shaft.

As to the output from the countershaft 22 to the input gears of a motor vehicle, this can be connected with a universal shaft, not separately shown here, which in a manner known per se drives one rear-axle or one front-axle differential transmission.

As can be inferred from FIG. 2, in an alternative of the invention it is possible in a dual-clutch transmission 40 that the reverse gear idler gear 39 is also driven so that the fixed gear 12 of the second transmission gear G2, fastened upon the hollow shaft 4, drives a reverse gear wheel 32 upon a reverse gear shaft 31, which carriers a second fixed gear 33. The latter then drives, as the toothing clip 34 indicates, the reverse idler gear 39. As the illustration shows, said reverse gear shaft 31 also is not in the plane fixed by the two transmission input shafts 4, 5 and the countershaft 22. This reverse gear shaft 31 is rather essentially positioned between the input shafts 4, 5 and the countershaft 22 so as to result in a very compact shape with regard to the transmission diameter.

Insofar as other marginal conditions in the design of the transmission allow this, the design of the dual-clutch transmission 40 according to FIG. 2 is to be preferred, since the first transmission gear G1 and the reverse gear RG are driven by two different input shafts 4, 5 which, as it is known, can certainly be connected by the two clutches of the dual clutch 2 alternatively to each other with the driving countershaft 3. Thereby, in particular, is possible a quick shifting between said two gears G1, RG which is advantageous, for ex., for a so-called removing a vehicle out from a short but deep road hole or from being stuck in snow.

FIG. 3 finally shows that the transmission design shown in FIG. 1 and specially in FIG. 2 can also be used in essence without great technical difficulties for a countershaft transmission 44 having only one starting and shifting clutch 41. Said clutch 41 is connected on its output side with one transmission input shaft 42 which is supported via the roller bearings 9, 18, 19 already known from the dual-clutch transmission 40. Paraxially to said single transmission input shaft 42 there is also used in this transmission 44 the countershaft 22 of the dual-clutch transmission 40.

For better clarity there have been omitted in this FIG. 3 a series of reference numerals. But the expert detects also that the gear sequence G6, G4, G2, RG, R1, G1, G3, G5 and G7 in the countershaft transmission 44 according to FIG. 3 is identical with that of the dual-clutch transmissions 1 and 40 respectively of FIG. 1 and FIG. 2.

The same also applies to the arrangement of the central bearings 18, 24 in the central bearing planes D and the distribution of the shifting sets 20, 21, 37, 38. The reverse gear shaft 31 with its two fixed gears 32 and 33 can likewise be used for manufacture of this countershaft transmission which also meshes here with the driving gear wheel 12 for the first gear G1 and with the reverse gear idler gear 39.

As understandable from the representation of this countershaft transmission 44, it can be used with advantage as normal manual shifting transmission or as automated selector and shiftable countershaft. At the same time, in spite of the axial juxtaposition of non-consecutive transmission gears even an H-wiring diagram can advantageously be used which can be implemented by transmission selector and shifting devices which are the object of other patent applications of the patentee.

The expert can easily achieve now that the selected transmission structure can be used without great changes both for a dual-clutch transmission 1, 40 and for manually and/or automated shiftable countershaft transmission 44. This represents a great advantage in cost in the production of such transmissions and in the storage of spare parts related to this.

| Reference Numerals |
| --- |
| 1 dual-clutch transmission |
| 2 dual-clutch; starting element |
| 3 crankshaft |
| 4 hollow shaft; input shaft |
| 5 input shaft |
| 6 roller bearing |
| 7 roller bearing |
| 8 roller bearing |
| 8 roller bearing |
| 9 roller bearing |
| 10 idler gear |
| 11 idler gear |
| 12 fixed gear |
| 13 toothing indication; clip |
| 14 fixed gear |
| 15 fixed gear |
| 16 idler gear |
| 17 idler gear |
| 18 roller bearing |
| 19 roller bearing |
| 20 shifting set |
| 21 shifting set |
| 22 countershaft |
| 23 roller bearing |
| 24 roller bearing |
| 25 roller bearing |
| 26 fixed gear |
| 27 fixed gear |
| 28 driving reverse gear wheel |
| 29 30 reverse gear shaft |
| 31 reverse gear shaft |
| 32 driveable reverse gear wheel |
| 33 driving reverse gear wheel |
| 34 toothing indication; clip |
| 35 fixed gear |
| 36 fixed gear |
| 37 shifting set |
| 38 shifting set |
| 39 reverse gear idler gear |
| 40 dual-clutch transmission |

| -continued |
| --- |
| Reference Numerals |
| 41 starting and shifting clutch; starting element |
| 42 transmission input shaft |
| 43 roller bearing in the hollow shaft |
| 44 countershaft transmission with one starting and shifting clutch |

The invention claimed is:

1. A countershaft transmission (1, 40, 44) comprising:
at least one starting element (2, 41);
at least one input shaft (4, 5, 42);
a countershaft (22);
a plurality of fixed gear wheels (12, 14) being fastened on the at least one input shaft (4, 5, 42),
at least a first pair of idler gear wheels (33, 34) and a plurality of fixed gear wheels being supported by the countershaft (22),
a plurality of shifting sets (20, 21, 37, 38) including a first shifting set (38) rotatably supported by the countershaft (22) and coordinated with the first pair of idler gear wheels (33, 34) for respectively engaging a first gear (G1) and a third gear (G3), and
at least one reverse gear shaft (30, 31) upon which is fastened at least a first fixed gear wheel (28, 29, 32, 33) for a reverse gear (RG),
wherein the first fixed gear wheel (28, 29, 32, 33) for the reverse gear (RG) meshes with a first fixed gear wheel (12, 14) of the plurality of fixed gear wheels (12, 14) fastened on the at least one input shaft (4, 5, 42), and the first fixed gear wheel (14, 12), of the plurality of fixed gear wheels (12, 14) fastened on the at least one input shaft (4, 5, 42), forms one of the first gear (G1) and a second gear (G2) of the transmission.

2. The countershaft transmission according to claim 1, wherein the at least one starting element is one of a dual clutch (2), a single clutch (41) and a hydrodynamic torque converter.

3. The countershaft transmission according to claim 1, wherein a differential transmission is located in one of an area of the starting element (2, 41) and an area of a vehicle rear axle.

4. The countershaft transmission according to claim 1, wherein said transmission is one of an automatic dual-clutch transmission (1, 40), an automated actuatable shifting transmission (44), and an manually actuatable shifting transmission.

5. The countershaft transmission according to claim 1, wherein the reverse gear (RG) and even numbered gears (G2, G4, G6) of the transmission are arranged between the at least one starting element (2, 41) and a central bearing plane (D) of the transmission, and odd numbered gears (G1, G3, G5, G7) of the transmission are arranged between the central bearing plane (D) and an end of the transmission opposite to the at least one starting element (2, 41).

6. A countershaft transmission (1, 40, 44) comprising:
at least one starting element (2, 41).
a hollow first input shaft (4) surrounding a second input shaft (5),
a countershaft (22),
a plurality of fixed gear wheels (12, 14) on at least one of the first and the second input shafts (4, 5, 42), and
at least one reverse gear shaft (30, 31) having at least a first fixed gear wheel (28, 29, 32, 33) fastened thereto for a reverse gear (RG), wherein the first fixed gear wheel (28, 29, 32, 33) for the reverse gear (RG) meshes with a first fixed gear wheel (12, 14) of the plurality of fixed gear wheels (12, 14) on at least one of the first and the second input shafts (4, 5, 42), the first fixed gear wheel (14, 12), of the plurality of fixed gear wheels (12, 14) fastened on at least one of the first and the second input shafts (4, 5, 42), forms one of a first gear (G1) and a second gear (G2) of the transmission;

a first shifting set (38) is supported by the countershaft (22) and coordinated with a first pair of idler gears (33, 34) for respectively engaging the first gear (G1) and a third gear (G3), a second shifting set (37) is supported by the countershaft (22) and coordinated with a second pair of idler gears (29, 39) for respectively engaging the second gear (G2) and the reverse gear (RG), a third shifting set (20) is supported by the first input shaft (4) and coordinated with a third pair of idler gears (26, 27) for respectively engaging a fourth gear (G4) and a sixth gear (G6), and a fourth shifting set (21) is supported by the second input shaft (5) and coordinated with a fourth pair of idler gears (35, 36) for respectively engaging a fifth gear (G5) and for a seventh gear (G7).

7. The countershaft transmission according to claim 6, wherein, commencing from a central bearing plane (D), gear ratios of the transmission increase in a direction toward the at least one starting element (2, 41) and in an opposite direction away from the central bearing plane (D).

8. The countershaft transmission according to claim 6, wherein the second input shaft (5) supports the fixed gears (14, 15) for lower gears (G1, G3) adjacent a first end of the first input shaft (4) and subsequently idler gears (16, 17) for higher gears (G5, G7) are mounted remote from the first end of the first input shaft (4).

9. The countershaft transmission according to claim 6, wherein upon the first input shaft (4), commencing from a central bearing plane (D) in a direction toward the starting element (41), the first fixed gear (12) and subsequently two idler gears (10, 11) are consecutively disposed on the first input shaft (4), and commencing from the central bearing plane (D) and proceeding away from the at least one starting element (2, 41) two additional fixed gears (14, 15) and subsequently two other idler gears (16, 17) are consecutively disposed on the second input shaft (5).

10. The countershaft transmission according to claim 6, wherein the reverse gear (RG) and the even numbered gears (G2, G4, G6) of the transmission are arranged between the at least one starting element (2, 41) and a central bearing plane (D) of the transmission, and the odd numbered gears (G1, G3, G5, G7) of the transmission are arranged between the central bearing plane (D) and an opposite end of the transmission.

11. The countershaft transmission according to claim 6, wherein the first hollow input shaft (4) supports two idler gear wheels and one fixed gear wheel, the second input shaft (5) supports two idler gear wheels and at least two fixed gear wheels, and the countershaft (22) supports four idler gear wheels and at least four fixed gear wheels.

12. The countershaft transmission according to claim 6, wherein the at least one starting element is one of a dual clutch (2), a single clutch (41) and a hydrodynamic torque converter.

13. A countershaft transmission (1, 40, 44) comprising:

at least one input shaft (4, 5, 42);

a countershaft (22);

a first shifting set (38) being supported by the countershaft (22) for engaging a first gear (G1) and a third gear (G3), a second shifting set (37) being supported by the countershaft (22) for engaging a second gear (G2) and a reverse gear (RG), a third shifting set (20) being supported by the at least one input shaft (4, 5, 42) for engaging a fourth gear (G4) and a sixth gear (G6), a fourth shifting set (21) being supported by the at least one input shaft (4, 5, 42) for engaging a fifth gear (G5) and a seventh gear (G7), the reverse gear (RG) being located between the first gear (G1) and the second (G2) and including at least one reverse gear shaft (30, 31) upon which is fastened at least a first fixed gear wheel (28, 29, 32, 33) for the reverse gear (RG), the first fixed gear wheel (28, 29, 32, 33) for the reverse gear (RG) meshes with a first fixed gear wheel (12, 14) on the at least one input shaft (4, 5, 42), and the first fixed gear wheel (14, 12), on the at least one input shaft (4, 5, 42), forms one of the first gear (G1) and the second gear (G2) of the transmission.

14. The countershaft transmission according to claim 13, wherein the reverse gear (RG) and the even numbered gears (G2, G4, G6) of the transmission are arranged between the at least one starting element (2, 41) and a central bearing plane (D) of the transmission, and the odd numbered gears (G1, G3, G5, G7) of the transmission are arranged between the central bearing plane (D) and an opposite end of the transmission.

* * * * *